(No Model.)

S. E. MAXON.
CAR COUPLING.

No. 246,025. Patented Aug. 23, 1881.

Attest:
Herm. Lauten
Geo. M. Finckel

Inventor:
Stiles Ezra Maxon
by his attorney
W. N. Finckel.

UNITED STATES PATENT OFFICE.

STILES E. MAXON, OF COUNCIL BLUFFS, IOWA, ASSIGNOR OF ONE-HALF TO W. C. JACKSON AND ONE-SIXTH TO R. J. RIDPATH, OF SAME PLACE.

CAR-COUPLING.

SPECIFICATION forming part of Letters Patent No. 246,025, dated August 23, 1881.

Application filed February 4, 1881. (No model.)

*To all whom it may concern:*

Be it known that I, STILES EZRA MAXON, a citizen of the United States, residing at Council Bluffs, in the county of Pottawattamie and State of Iowa, have invented certain new and useful Improvements in Car-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is in the nature of improvements in car-couplings, and has special reference to that class wherein the coupling of two approaching cars is effected automatically, I by my construction obtaining what may be appropriately termed a "self-setting" coupler.

The invention consists in a hook operated within a draw-head by means of a lever connected with a setting-dog, whereby as the hook is raised to permit the withdrawal of the link the setting-dog is also raised, and the link, in its passage out coming in contact with said dog, throws it down, and with it its connected lever, whereby, the support for the hook being withdrawn, said hook also falls and is ready to engage and hold the next inserted link to couple cars, suitable springs being employed in connection with the dog and hook to prevent the hook from accidentally releasing the link held by it.

The invention further consists in providing a hood over the hook to exclude the rain, ice, &c.

The invention further consists in providing a cast-metal draw-head with a renewable facing of malleable metal, to prevent injury to the draw-head by the violent contacts to which it is subjected.

The invention further consists in the details of construction hereinafter specifically set forth and claimed.

Figure 1:
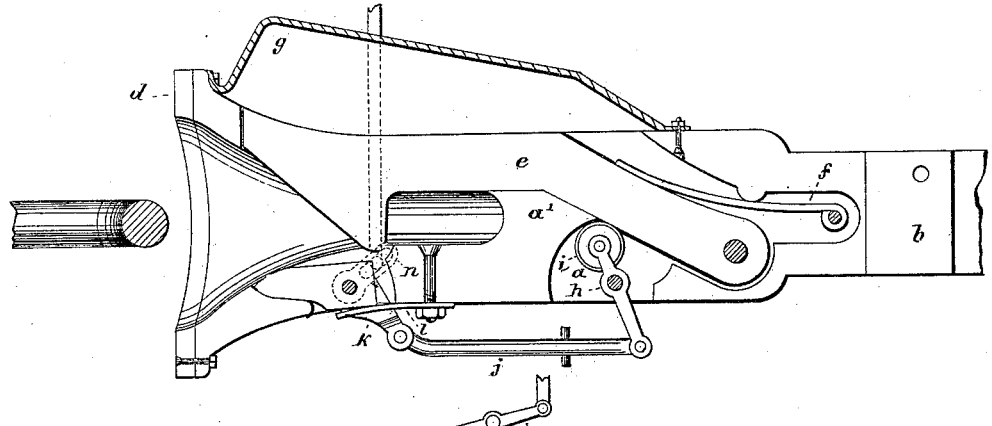
Figure 2:
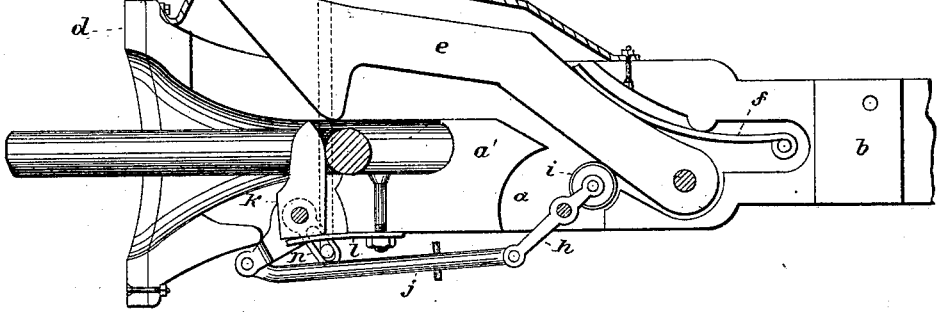
Figure 3:
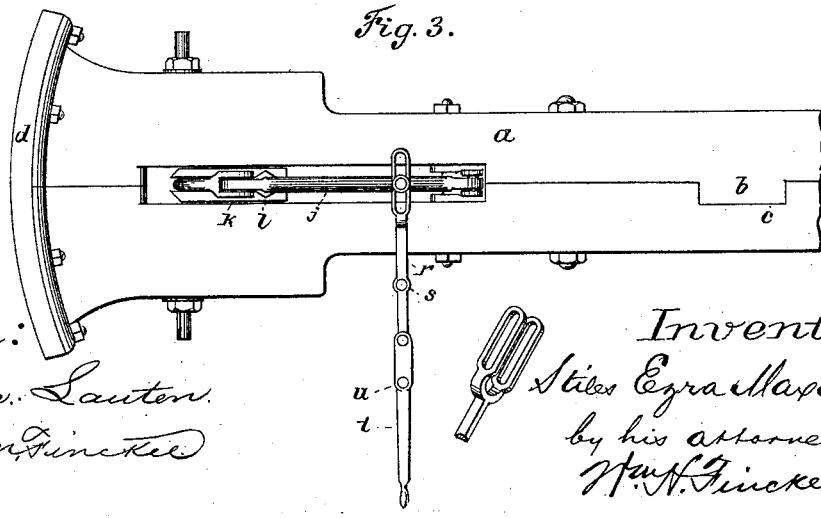

In the accompanying drawings illustrating my invention, in the several figures of which like parts are similarly designated, Figure 1 is a longitudinal sectional view of my coupler set or in its normal position, ready to receive the link of an approaching car. Fig. 2 is a similar view with the parts in position to permit the removal of a link, Fig. 1 showing the position of the parts consequent upon the action of the link in its withdrawal; and Fig. 3 is a bottom-plan view of the coupler adapted for passenger-cars.

The draw-head $a$ may be made of cast-iron, in two parts, bolted together, and if so made will have a lug, $b$, on one half entered into a socket, $c$, in the other, for the purpose of strengthening the parts and preventing their displacement by concussion, taking the strain measurably off the bolts; but I do not limit my invention to a draw-head made in two or more parts, since it may be cast with suitable cores and molds in one piece.

Cast-iron draw-heads, under the severe usage to which they are subjected, frequently split off at their mouths, and to remedy and prevent this injury I face the mouth with a rim, $d$, of malleable metal, as iron, bolted thereto. The soft character of such metal will yield under the blows of the draw-heads, thus taking the concussions from them, and as this rim or facing is battered and worn it may be readily removed and replaced by a new one, thus effecting a considerable saving of stock.

Within a vertical longitudinal recess in the draw-head is pivoted a hook, $e$, depressed by a spring, $f$, and having a vertical movement within said recess upon its pivot. This recess and its contained hook are protected from the weather by a sheet-metal hood, $g$, bolted to the top of the draw-head, and of sufficient height to permit the rise of the hook. The fall of the hook may be stopped by any suitable portion, as $a'$, of the draw-head interior.

A lever, $h$, is pivoted within the draw-head beneath the hook, and carries next the under face of the hook a roller, $i$, playing against said hook. The lower arm of this lever is connected by a link, $j$, and flexible joints with a dog, $k$, pivoted substantially in horizontal line with the lever and moving with said lever. The lever $h$ is arranged at the rearward end of the hook and the dog $k$ slightly in advance of the beak of the same, and said dog in its normal position, as shown in Fig. 1, lies horizontally in a cavity in the forward or mouth end of the draw-head. A spring, $l$, underlies the dog, and its tendency is to hold it firmly in either of its positions; but the two springs $f$ $l$ coact to hold the hook in the coupling position, and so prevent accidental uncoupling. A cavity is left in the draw-head for the link between the inner face of the beak of the hook and the portion $a'$ of the draw-head, the aggregate length of which in adjacent draw-heads is such as to allow the link to rest loosely therein when the draw-heads approach, and so take from the said link the strain and compression of contact, and also permitting perfect freedom of motion of the link.

The normal position of the hook is shown in Fig. 1, and when a link to couple two cars is to be introduced into the draw-head the momentum of the car will be sufficient to enable the link to overcome the force of the springs, raise the hook, and pass under its beak, when the hook immediately drops and so retains the link. When the cars are to be uncoupled, the roller-lever is moved backward and raises the hook, and at the same time raises the dog, all as in Fig. 2. The link may then be withdrawn, and in its withdrawal, after passing the beak of the hook, it comes into contact with the dog $k$, overcomes its spring which holds it up, and throws said dog down into the position shown in Fig. 1, which causes the lever $h$ to move forward and drop the hook or set it ready to engage the next link introduced, as in Fig. 1.

The movement of the hook-lever $h$ and dog to uncouple the cars may be effected in freight-cars by a rod, $m$, loosely jointed to an arm, $n$, rigidly connected with the dog $k$, said rod being jointed to a lever, $o$, secured to the front or side of the car, and having a rod, $p$, extending from its other arm to the roof of the car, within convenient reach of a brakeman, the rods being balanced so as not to accidentally uncouple the cars.

In a passenger-car the operation of the hook may be effected by a lever, $r$, connected by a slotted forked arm and pin, to permit freedom of motion of the draw-head with the link $j$, (see Fig. 3,) pivoted at $s$, and jointed to a hand-lever, $t$, pivoted at $u$ beneath the platform, and extended beyond the platform to the corner of the car, so as to be in convenient reach of a brakeman. By thus pivoting this last system of operating-levers, any impact against the hand-lever $t$ in the direction of movement of the train will not tend to uncoupling, the uncoupling being effected by movement of the hand-lever in the opposite direction.

What I claim is—

1. In a car-coupling, a coupling-hook, a device operated to raise said hook to permit the uncoupling of the cars, and a dog connected with said hook-raising device to automatically reset the hook by the action of the outgoing link upon it, (the said dog,) substantially as described.

2. In a car-coupling, a movable hook to engage the link, adapted to be raised to permit the uncoupling of the cars, and a dog connected with the hook-raising mechanism and thrown by the raising of the hook into position to be acted upon by the withdrawal of the link to reset the hook to engage the next inserted link, substantially as described.

3. A pivoted spring-hook, a roller-lever for raising the same, and a spring-dog jointed to said lever, combined and arranged to operate substantially as described.

4. The combination, with the draw-head, of the sheet-metal hood $g$, bolted to said draw-head over an opening therein containing a coupling-hook, to exclude rain, &c., substantially as described.

5. A car-coupling draw-head, of cast metal, having its mouth provided with the rim $d$, of malleable metal, bolted directly thereto, as shown, and adapted to take the shock of contact, prevent chipping and breaking of the draw-head, and to be renewed when worn, all as described.

6. A two-part draw-head bolted together and provided with a lug on one part fitted in a socket in the other part, substantially as and for the purpose described.

In testimony whereof I affix my signature in presence of two witnesses.

STILES EZRA MAXON.

Witnesses:
WM. H. FINCKEL,
GEO. M. FINCKEL.